US006532418B2

United States Patent
Chun et al.

(10) Patent No.: US 6,532,418 B2
(45) Date of Patent: Mar. 11, 2003

(54) VEHICLE NAVIGATION NETWORK, APPARATUS AND METHOD FOR USE IN A MOBILE TELECOMMUNICATION SYSTEM

(75) Inventors: Kyung-Joon Chun, Seoul (KR); Nak-Koo Kim, Songnam-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/897,242

(22) Filed: Jul. 2, 2001

(65) Prior Publication Data

US 2003/0014187 A1 Jan. 16, 2003

(51) Int. Cl.[7] .............................................. G01C 21/00
(52) U.S. Cl. .................... 701/209; 701/24; 342/357.09; 342/357.1
(58) Field of Search ............................... 701/201, 209, 701/211, 213, 24, 25; 342/357.06, 357.09, 357.1, 357.12, 357.13; 340/988, 990

(56) References Cited

U.S. PATENT DOCUMENTS 5,187,810 A * 2/1993 Yoneyama et al. ......... 455/34.1
5,974,356 A * 10/1999 Doyle et al. ................ 701/209

* cited by examiner

*Primary Examiner*—Yonel Beaulieu
(74) *Attorney, Agent, or Firm*—Dilworth & Barrese, LLP (57) ABSTRACT

There is provided a vehicle navigation network using a mobile telecommunication system. In the vehicle navigation network, a vehicle navigation apparatus has a satellite signal receiver and a mileage calculator, which determines a current location of a vehicle based on a satellite signal and a mileage of the vehicle to its destination, and transmits information about the vehicle location from a mobile terminal to a base station transceiver system (BTS) periodically. The BTS receives a signal from the mobile terminal and transmits data to a base station controller (BSC), when a vehicle navigation service is requested. The BSC is connected to the BTS, which discriminates a call requesting the vehicle navigation service from a typical voice call and transmission of a text message. The BSC connects the voice call to a mobile switching center (MSC) in the case of the voice call, and connects the vehicle navigation service requesting call to one of a plurality of asynchronous transfer mode (ATM) switches when the vehicle navigation service requests the call. The ATM switches are connected to a navigation server, for a handoff and transmission of packet data when the BSC requests the vehicle navigation service. When the vehicle navigation service is requested from an ATM switch, the navigation server receives information about the current location and destination of a vehicle, road condition information, and map information and transmits route information to the navigation apparatus.

15 Claims, 8 Drawing Sheets

VEHICLE NAVIGATION NETWORK, APPARATUS AND METHOD FOR USE IN A MOBILE TELECOMMUNICATION SYSTEM

BACKGROUND OF THE INVENTION

1. Field of the Invention

The present invention relates generally to a navigation apparatus and method utilizing satellites, and in particular, to a vehicle navigation apparatus and method for use in a mobile telecommunication system.

2. Description of the Related Art

Navigation applications traditionally utilized satellites for determining the position of aircraft or vessels and finding navigation routes for aircraft or vessels, but are now becoming popular with vehicles. As the demand for navigation systems in vehicles continues to grow, technology has been developed to determine more accurate positioning and navigational routes for vehicles. An existing vehicle navigation system only locates the vehicle via satellites, displays a map by reading map data from an in-vehicle device, and offers a short cut or the shortest navigational route the vehicle can take to reach a destination on the map. If a driver is not familiar with the area where his vehicle is located or he does not accurately know his location, then the navigation system just provides information about the location of the vehicle and routes that the vehicle may take in order to reach a certain destination.

Figure 1:
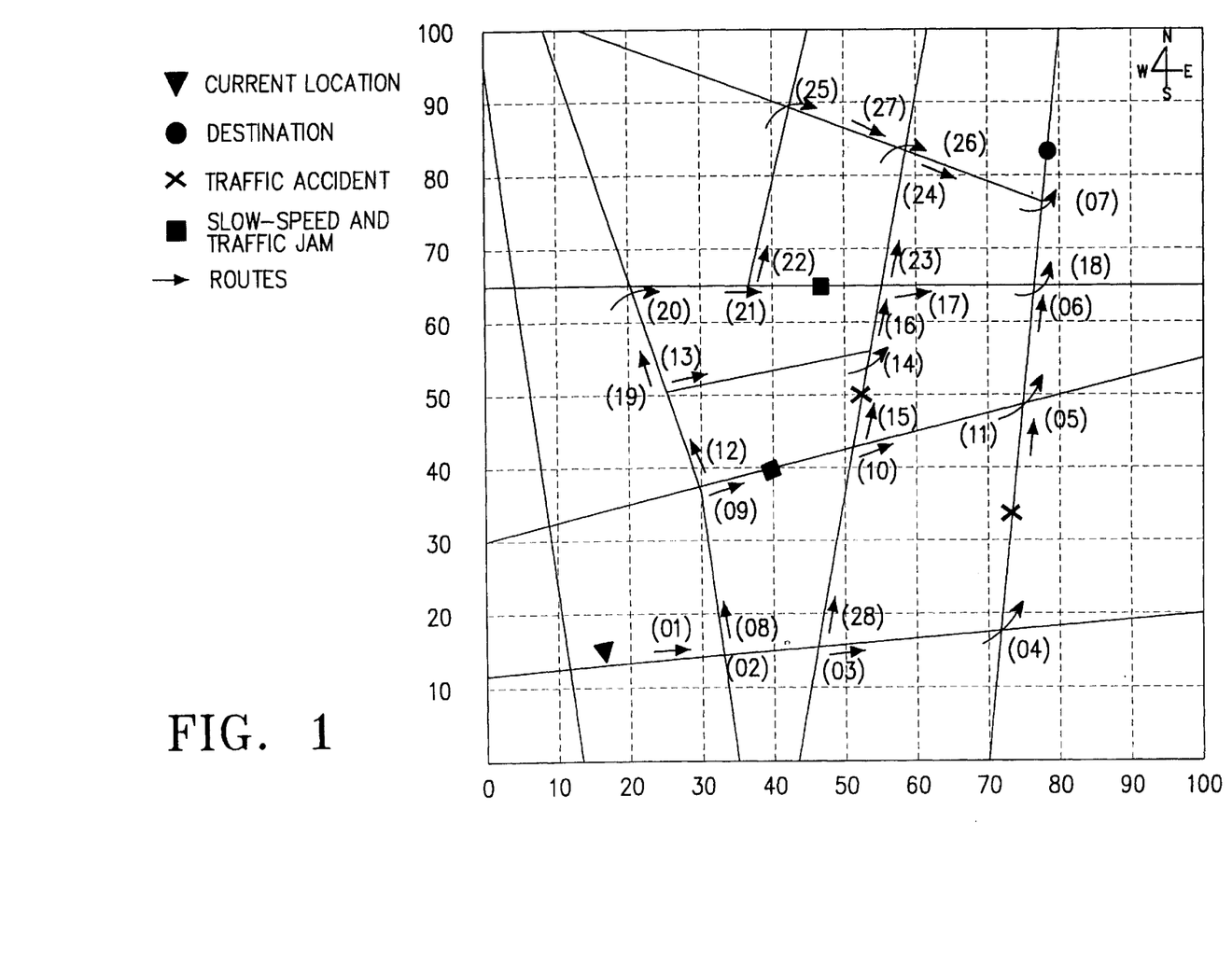
FIG. 1 illustrates an exemplary map with the location of a vehicle and its destination marked thereon for a vehicle navigation system.

A destination can be reached by utilizing many routes. If the driver is not aware of road conditions of any of the routes, for example, if a traffic accident occurs or if traffic is heavy on the route that he selects, he has no choice but to stay on that route until he can find another route to utilize. FIG. 1 provides a description of the many routes a vehicle may use to reach an intended destination. FIG. 1 is an exemplary map with the location of a vehicle and its destination marked thereon for a vehicle navigation system. The vehicle is now located midway between 10 and 20 on a horizontal axis and midway between 10 and 20 on a vertical axis. The coordinates of the destination are given as midway between 70 and 80 on the horizontal axis and midway between 80 and 90 on the vertical axis. There are many guide routes from the location of the vehicle to the destination. One of these routes is: to drive on road (01), to road (02), to road (03), to road (04), to road (05), to road (06). The vehicle can travel to the destination by utilizing other routes that can be taken along the roads indicated by reference numerals roads (08) to (27). The existing navigation system using satellites, informs the driver of the location of the vehicle, but it is impossible for the driver to know the current road conditions. A vehicle navigation apparatus reads map data and displays one of many possible routes a driver may take to reach a destination. The driver determines the best route, based on the displayed route of the navigational system, and then travels on the best route to the destination.

As shown in FIG. 1, however, if a traffic accident occurs on the road (04), which is not reported to the driver, then the driver will experience heavy traffic in that area. If the driver takes the road (09) instead of road (04), he will have to slow down because the road (09) is a slow-speed zone or because there is a traffic jam on road (09).

While an automatic guidance system may be employed in the navigation system to automatically offer the best route, it simply provides route information via a screen and voice prompts, which advises the driver of a short cut to his destination.

SUMMARY OF THE INVENTION

It is, therefore, an object of the present invention to provide a vehicle navigation system or network, and a vehicle navigation apparatus in a mobile telecommunication system, which provides accurate information about road conditions along a traveling route.

The above and other objects can be achieved by providing a vehicle navigation network, apparatus and method for use in a mobile telecommunication system. In the vehicle navigation network, a vehicle navigation apparatus has a satellite signal receiver and a mileage calculator, which determines the current location of a vehicle based on a satellite signal and the mileage of the vehicle, and transmits information about the vehicle location from a mobile terminal to at least one base station transceiver system (BTS) periodically. The BTS receives a signal from the mobile terminal and transmits data to a base station controller (BSC), when a vehicle navigation service is requested. The BSC is connected to at least one BTS which discriminates a call requesting the vehicle navigation service from a typical voice call and transmission of a text message, connects the voice call to a mobile switching center (MSC) in the case of the voice call, and connects the vehicle navigation service requesting call to one of a plurality of asynchronous transfer mode (ATM) switches when the vehicle navigation service requests the call. The ATM switch is connected to a navigation server, for a handoff and transmission of packet data when the BSC requests the vehicle navigation service. When the vehicle navigation service is requested from an ATM switch, the navigation server receives information about the current location and destination of a vehicle, road condition information, map information and transmits route information to the navigation apparatus.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 2:
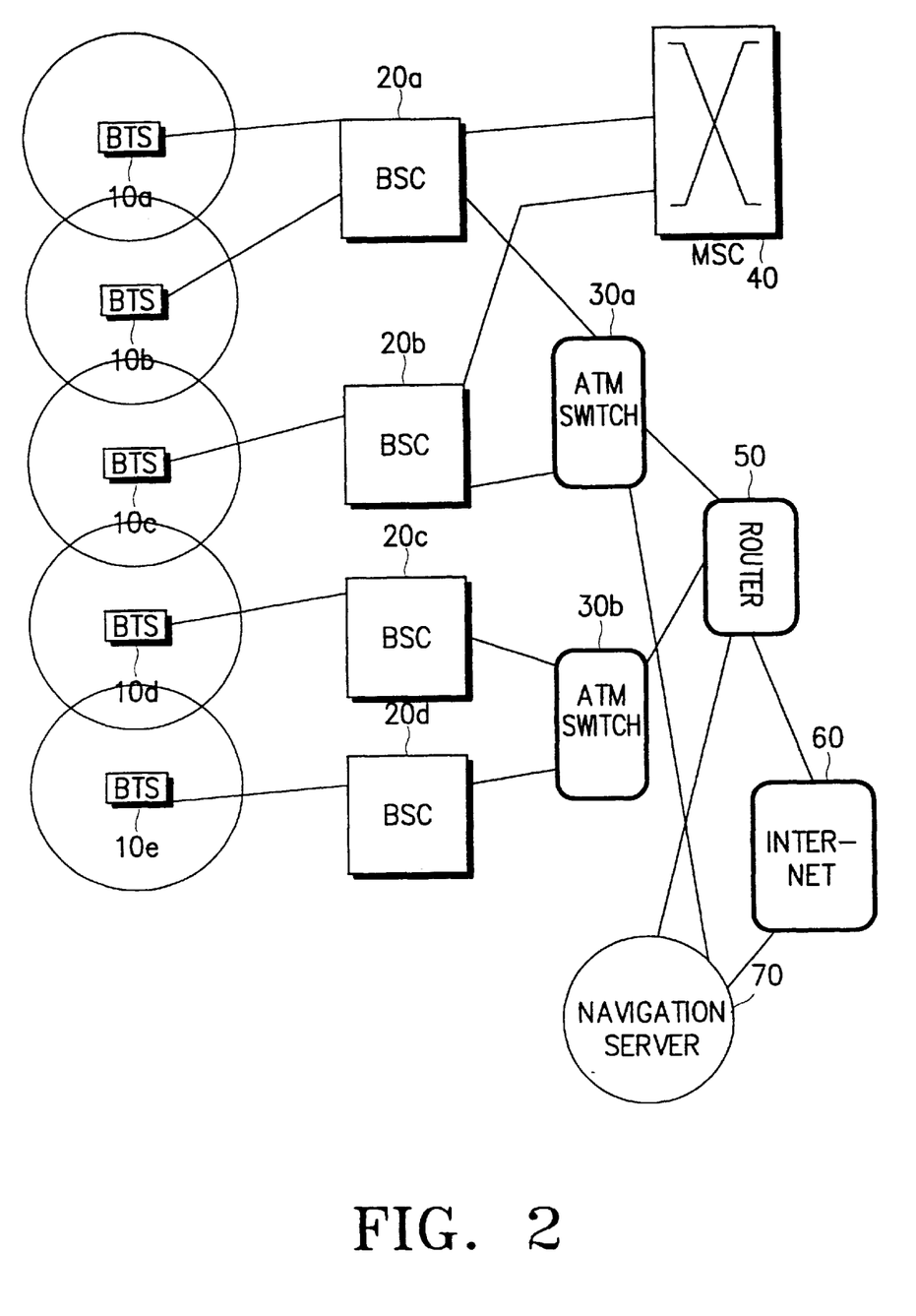
FIG. 2 illustrates a network configuration for operating a vehicle navigation system in conjunction with a mobile telecommunication system according to the present invention.

FIG. 2 illustrates a network configuration for operating a vehicle navigation system in conjunction with a mobile telecommunication system according to the present invention. The structure and operation of the mobile telecommunication system according to the present invention will be described in detail referring to FIG. 2.

In FIG. 2, each of BTSs 10a to 10e have a predetermined coverage area for wireless communication and control a call connection for traffic transmission/reception with a mobile station (MS) (not shown) on radio channels. Those of ordinary skill in the art recognize that a mobile station of any mobile communication system, such as a personal cellular system (PCS), Interim Standard 95 (IS 95) of IMT-2000, may be utilized by this invention. Base station controllers (BSCs) 20a to 20d are connected to the BTSs 10a to 10e. Each BSC provides control to its respective BTSs. For a voice call and text message transmission, the BSC is connected to a mobile switching center MSC 40, whereas for a navigation service according to the present invention, the BSC is connected to a navigation server 70 via an ATM switch (GAN: General Asynchronous transfer mode switch Network) 30a or 30b. In the case where routing should be performed between the ATM switches 30a and 30b, that is, road condition information should be provided continuously beyond one MSC, a router 50 is used.

For example, if a driver travels from LA to San Francisco, information about road conditions should be provided to him without interrupting a call in a mobile terminal. Thus, the mobile terminal must be switched to another ATM switch 30b, if it is connected to the ATM switch 30a. Here, the router 50 provides information about the call to the ATM switch 30b, so that an anchor BSC 20c or BSC 20d can perform a handoff or Drop Call Recovery (DCR) successfully and provide a navigation service continuously. The router 50 is connected to the navigation server 70 directly by an exclusive line or via the Internet 60. If the router 50 is connected to the Internet 60, channels are secured all the time. The ATM switches 30a and 30b are connected via the router 50.

Figure 3:
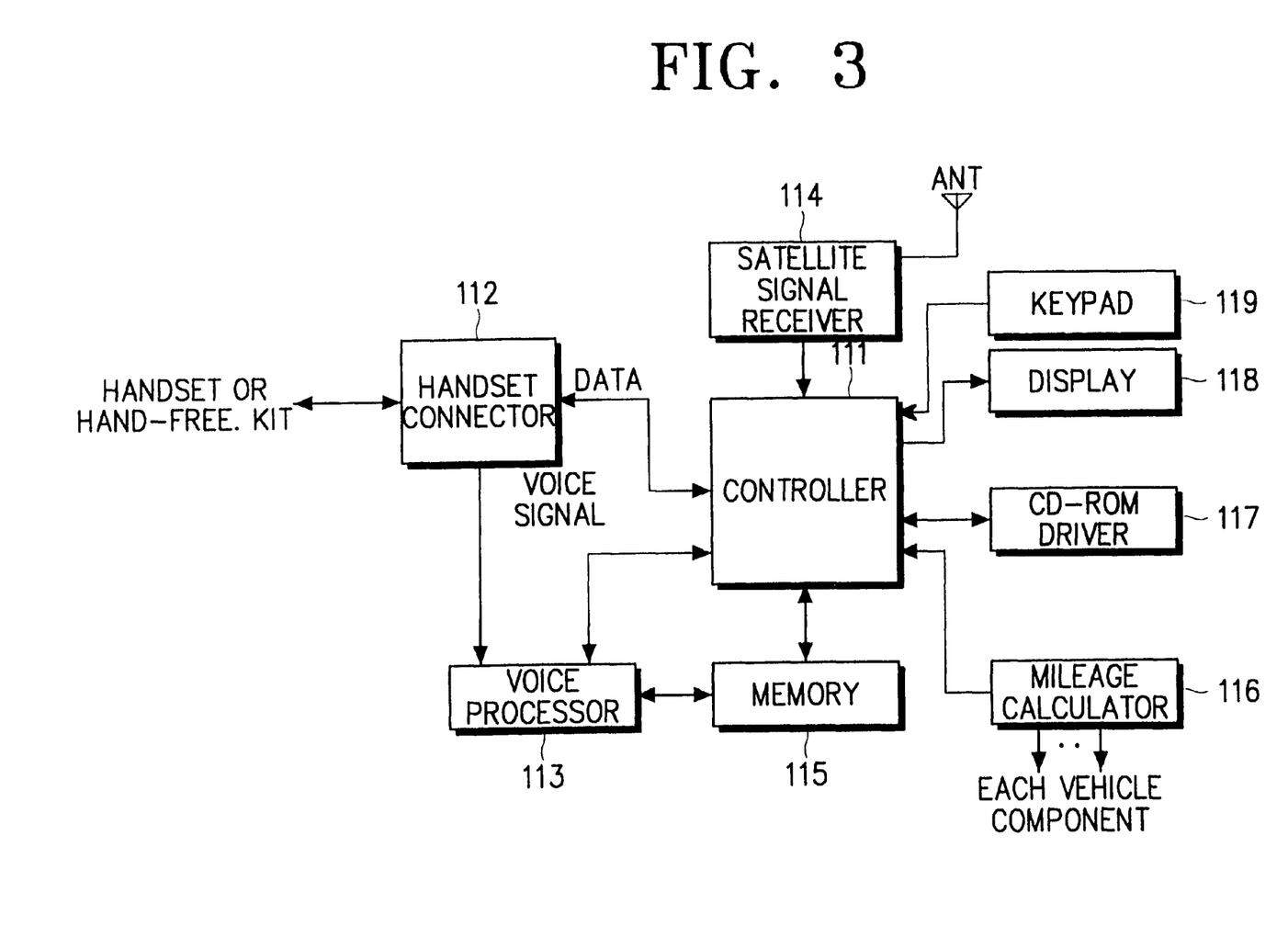
FIG. 3 is a block diagram of a vehicle navigation apparatus according to the present invention.

FIG. 3 is a block diagram of a vehicle navigation apparatus according to the present invention. The structure and operation of the vehicle navigation apparatus will be described in detail with reference to FIG. 3.

A handset connector 112 is connected to a handset or a hand-free kit for holding the handset inside a vehicle and processes a voice signal received from the handset and data received from controller 111 separately. Voice processor 113 translates a voice signal received from the handset connector 112 into a corresponding word and feeds the translated data to the controller 111. Memory 115 stores data used for voice processing in the voice processor 113 and data needed for the control operation of the controller 111. The memory 115 also temporarily stores data generated during the control operation of the controller 111. Satellite signal receiver 114 converts a radio signal indicating the location of the vehicle received from a satellite via an antenna ANT to electrical data. Mileage calculator 116 is connected to components of the vehicle such as wheels and an engine and calculates the mileage and speed of the vehicle based on data received from the aforementioned components. Upon receipt of a map information request signal from the controller 111, CD-ROM driver 117 reads data from a CD-ROM. Display 118 display roads necessary for navigation guidance, the current location of the vehicle, and its destination under the control of the controller 111. The display 118 also displays road conditions under the control of the controller 111. The controller 111 provides overall control to the vehicle navigation apparatus. Particularly, the controller 111 is connected to the navigation server through the mobile phone, for receiving information about road conditions and routes along the traveling directions of the vehicle and displaying the information on the display 118. While the handset connector 112 is connected to the handset or the hand-free kit in FIG. 3, the handset connector 112 can be incorporated into the hand-free kit during the manufacturing process. Though the CD-ROM driver 117 reads map data and feeds it to the controller 111, a semiconductor memory can be used instead of the CD-ROM driver, or the navigation server can provide the map information. In this case, the CD-ROM driver 117 and the semiconductor memory can be omitted. Keypad 119 includes keys needed for vehicle navigation and senses key input from a user.

Figure 4:
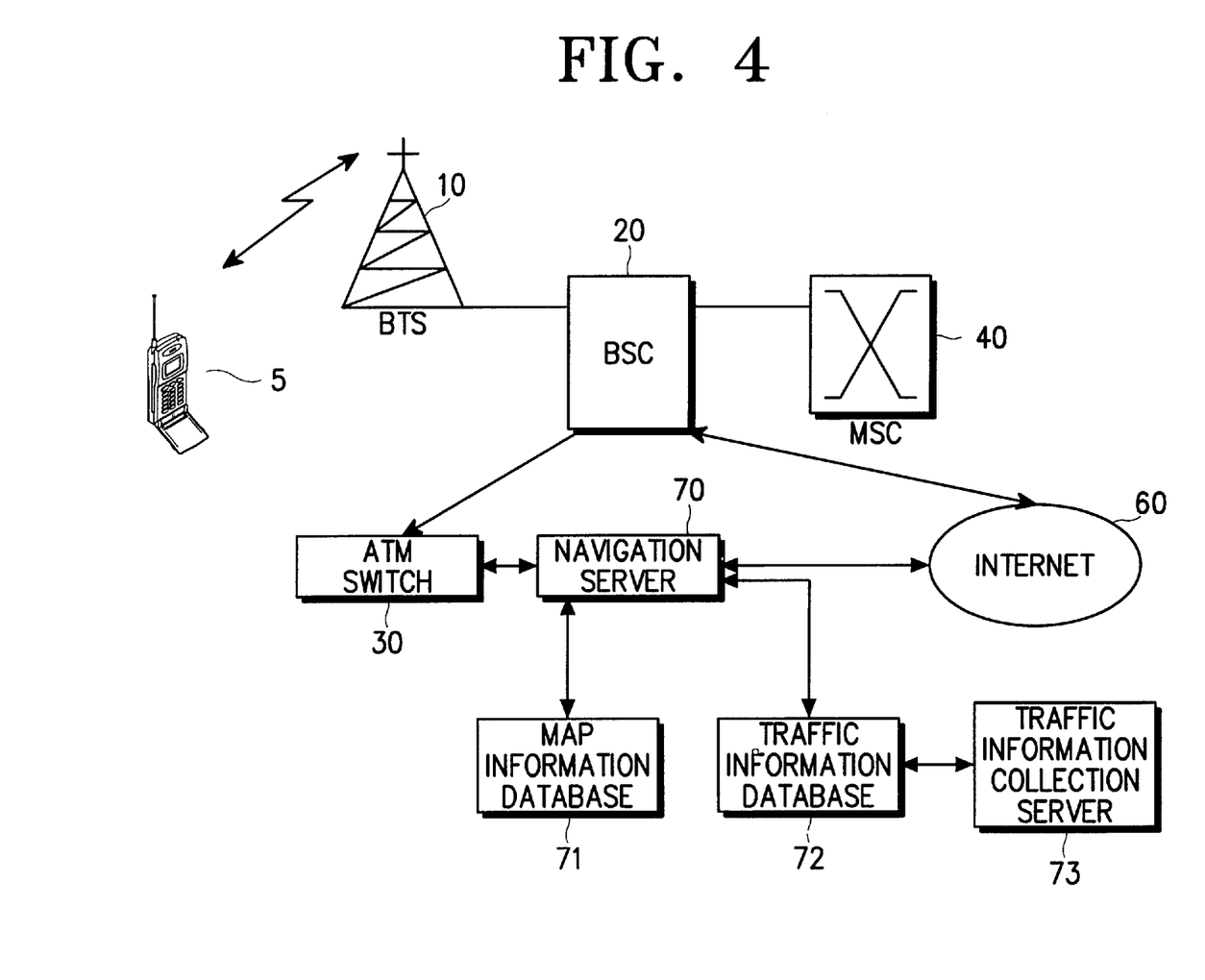
FIG. 4 illustrates a network configuration where the mobile telecommunication system is connected to a navigation server according to a preferred embodiment of the present invention.

FIG. 4 illustrates a network configuration where a mobile telecommunication system is connected to a navigation server according to a preferred embodiment of the present invention. The connection between the mobile telecommunication system and the navigation server will be described in detail with reference to FIG. 4.

A BTS 10 is connected to a BSC 20 by wire and exchanges data with mobile phone 5 wirelessly. When the mobile phone 5 requests a voice call to the BTS 10, the BSC 20 connects a call to MSC 40. When a navigation service is requested by mobile phone 5, the BSC 20 is connected to the navigation server 70 via ATM switch 30 or the Internet 60. The navigation server 70 is connected to map information database 71 and traffic information database 72, respectively, for receiving map information and checking traffic conditions. When the mobile phone requests a navigation service, the navigation server 70 determines whether the mobile phone 5 has been registered for the navigation service and if it has, the navigation server 70 notifies the mobile phone 5 of the best route by utilizing the traffic information database 72. If the road conditions change, the navigation server 70 updates the route information and provides traffic information to mobile phone 5. Traffic information collection server 73 collects information about road conditions from operators by utilizing speedometers and cable cameras stationed at significant or strategic areas on different roads and then updates the traffic information database 72.

Figure 5:
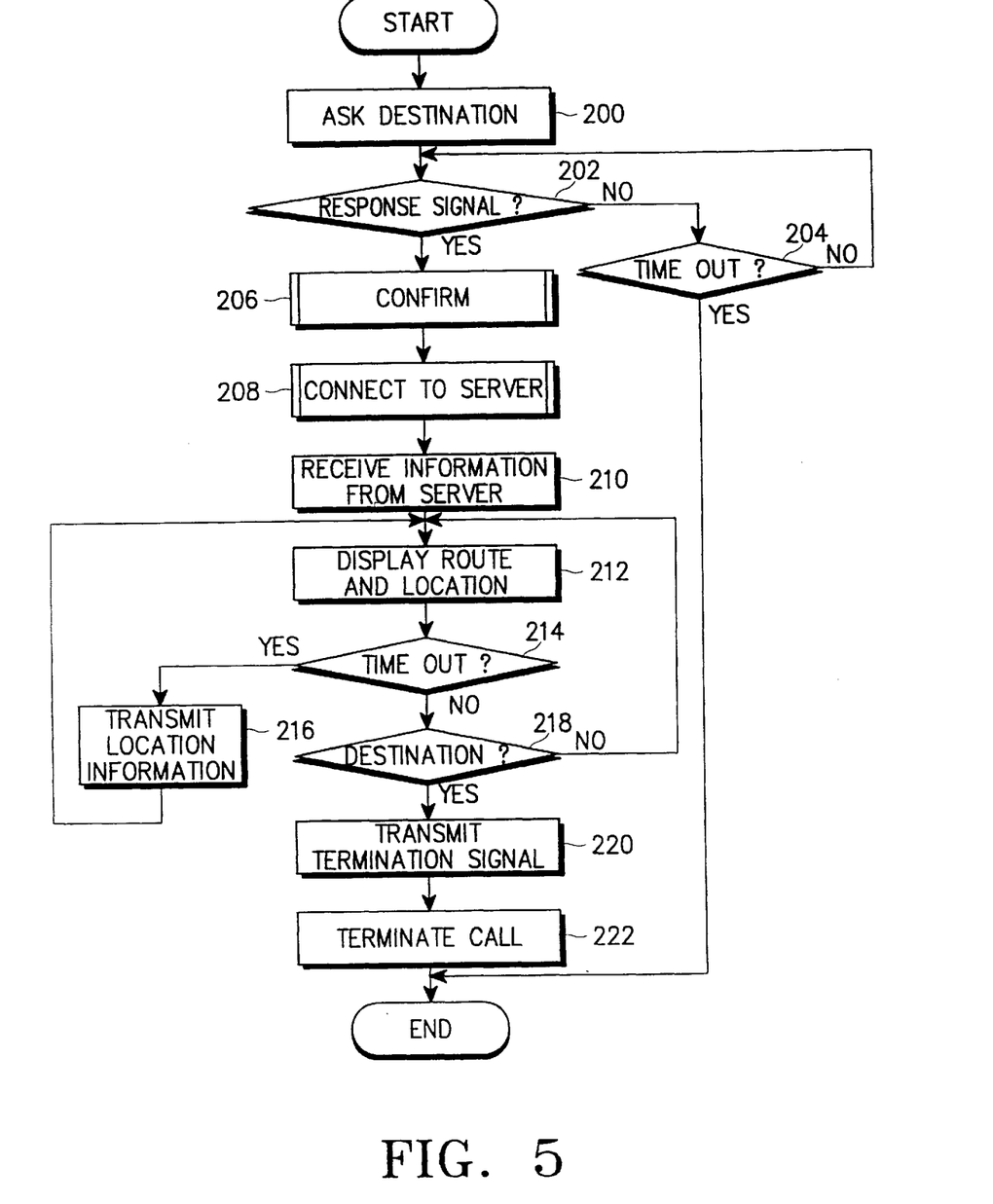
FIG. 5 is a flowchart illustrating a control operation for receiving a navigation service using a mobile terminal in the vehicle navigation apparatus according to the preferred embodiment of the present invention.

FIG. 5 is a flowchart illustrating a control operation for receiving a navigation service by utilizing a mobile phone in the vehicle navigation apparatus according to the preferred embodiment of the present invention.

Referring to FIGS. 1 to 5, when the navigation apparatus is initialized or turned ON, the procedure goes to step 200. The navigation apparatus can be turned ON by means of pressing a separately designated key on the mobile phone 5. The navigation apparatus may also be automatically turned ON when the vehicle is turned ON. In step 200, the controller 111 reads character data and voice data asking a destination from the memory 115, outputs the voice data to the handset connector 112, and displays the character data to the display 118. For example, a message "where are you going?" may be outputted via the display 118 or by the voice processor 113. The voice data is outputted from the handset connector 112 via a speaker provided to the hand-free kit. Then, a timer is set to a predetermined time. The controller 111 determines whether a response signal has been received from the keypad 119 or the handset connector 112 based on the sent message in step 202. Upon receipt of the response signal, the procedure goes to step 206 to confirm that the message has been received. If a response signal has not been received from keypad 119 or handset connector 112, the process goes to step 204. In step 204, the controller 111 determines whether the timer has expired. If the timer has not expired, the controller 111 returns to step 202, and if the timer has expired, the procedure ends.

Figure 6:
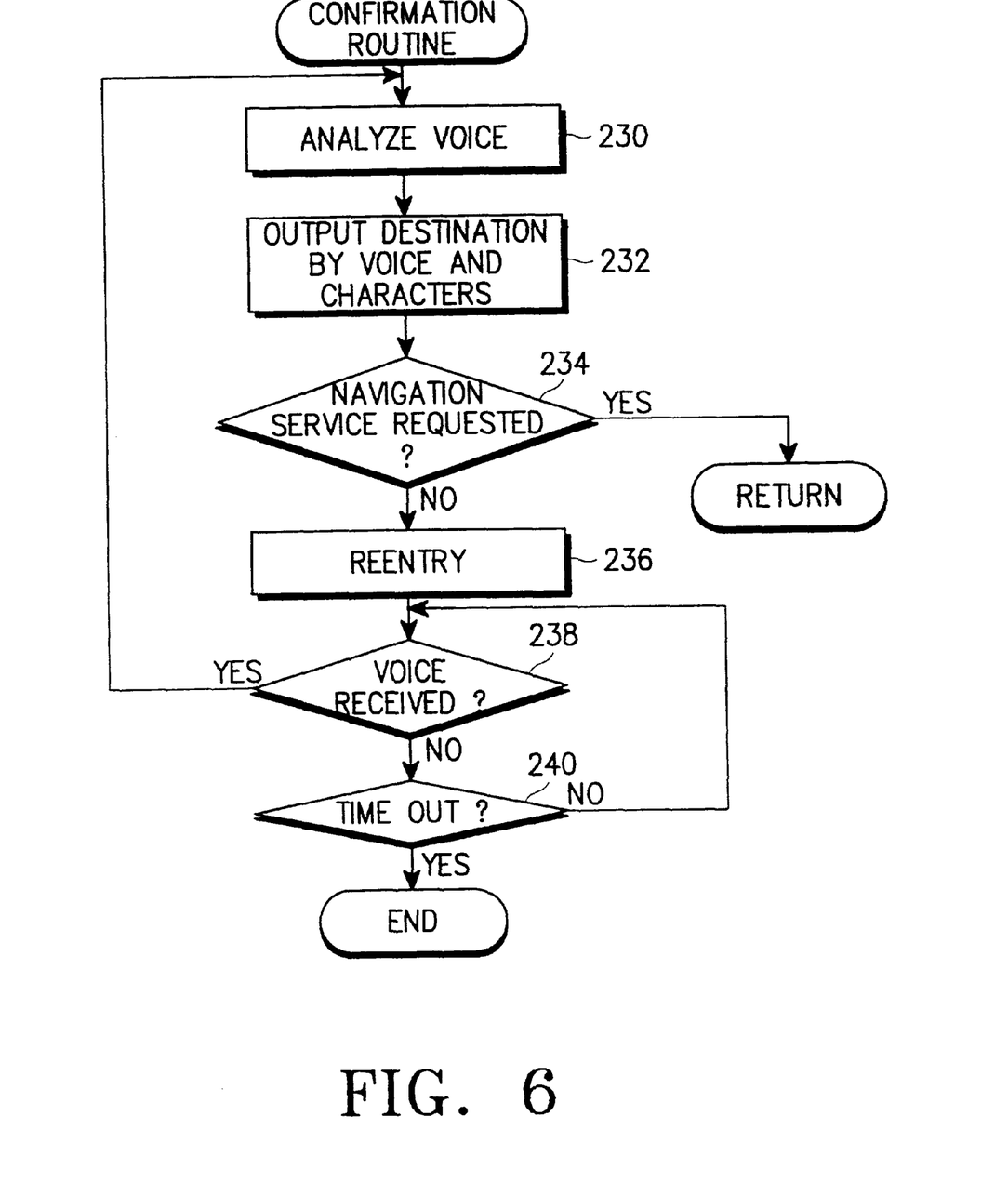
FIG. 6 is a flowchart illustrating a control operation for a sub-routine of confirming a destination by a voice signal.

Referring to FIG. 6, the sub-routine of confirming a destination by a user's voice will be described. FIG. 6 is a flowchart illustrating a control operation for confirming a destination by a user's voice according to the embodiment of the present invention.

Upon receipt of the response signal from the user in step 202 of FIG. 5, the controller 111 analyzes the received voice signal in step 230 and generates voice data and character data corresponding to a destination indicated by the voice signal, in step 232. Then, the controller 111 outputs the voice data to the handset connector 112 and displays the character data on the display 118. In step 234, the controller 111 determines whether a navigation service request signal has been received. Upon receipt of the navigation service request signal, the controller 111 terminates the confirmation sub-routine and goes to step 208 of FIG. 5 to connect to navigation server 70. If the navigation service request signal is not received, the controller 111 reads voice data and character data requesting reentry of the destination from the memory 115 and outputs the voice data and the character data to the handset connector 112 and the display 118, respectively, in step 236. The controller 111 also sets the timer to the same time as set in step 202. Upon receipt of a voice signal from the user in step 238, the controller 111 returns to step 230. If the voice signal has not been received, the controller 111 determines whether a time out signal has been received from the timer, in step 240. If the time out signal has not been received, the controller 111 returns to step 238, and if the time out signal has been received, the controller 111 ends the sub-routine without returning to the routine of FIG. 5.

The confirmation sub-routine is performed by instructing the user to enter a specific destination where the user wants to go to by voice and then characters corresponding to the voice via the keypad 119, or in a speech recognition method with an increased probability of speech recognition.

Referring to FIG. 5 again, after the confirmation sub-routine, the controller 111 performs a connection routine with the navigation server, in step 208. A call set-up between the mobile phone (MS) and a BTS in the server connection routine will be described referring to FIG. 7.

Figure 7:
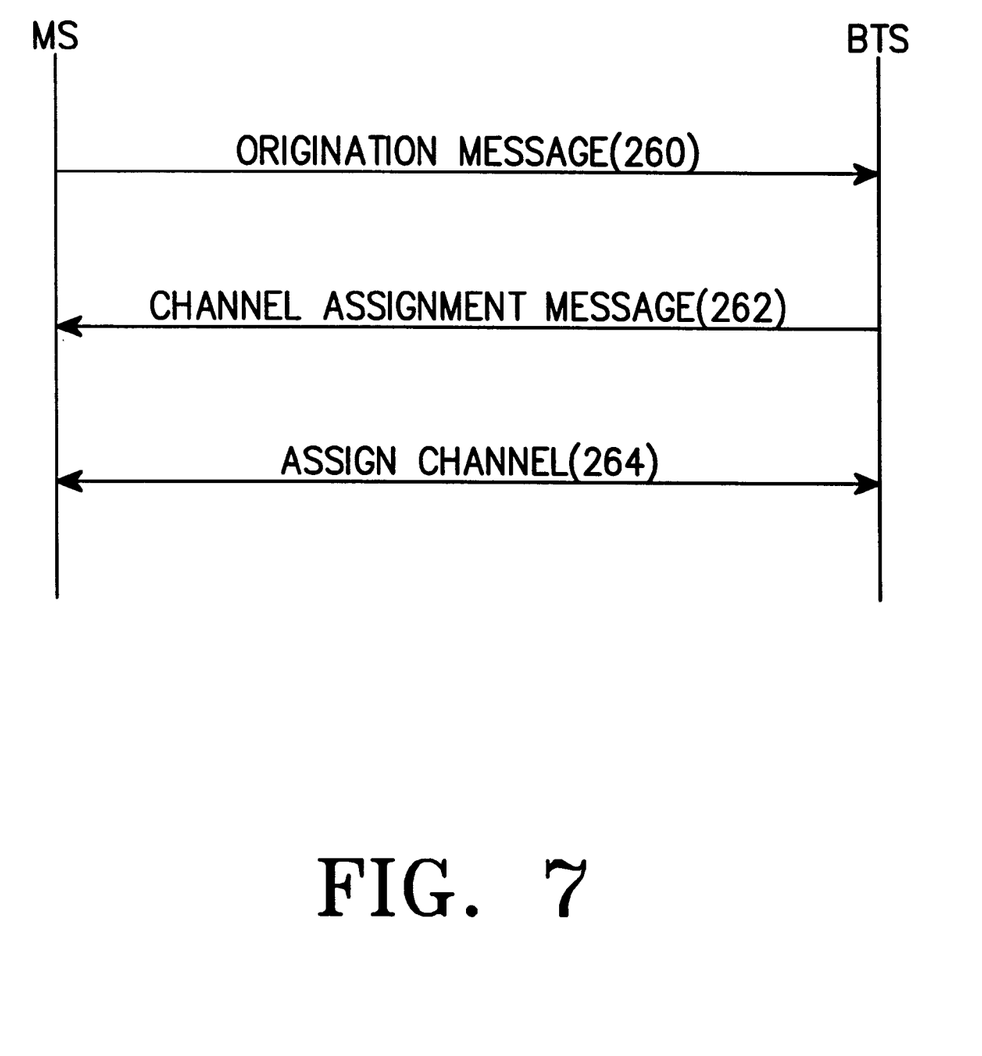
FIG. 7 is a signal flow diagram for a call set-up between a mobile station (MS) and a base station transceiver system (BTS) according to the preferred embodiment of the present invention.

FIG. 7 is a signal flow diagram for a call set-up between the MS and the BTS according to the embodiment of the present invention.

The MS transmits an origination message (OM) based on the IS-95B standards to the BTS in step 260. A navigation service is requested with Service_Option and Special_Service to appropriate values in the OM. The OM is constructed such that a vehicle navigation service is discriminated from a voice call with message fields shown below.

TABLE 1

| Field | Length (bits) |
|---|---|
| Special_Service | 1 |
| Service_Option | 0 or 16 |

The field of Service_Option should be set to indicate an available data service according to the Standard Service Option Number Assignments defined by TSB-58A and shown in Table 2.

TABLE 2

| Service Option Number (Decimal) | Designated/Type of Service |
|---|---|
| 1 | Basic Variable Rate Voice Service (8 kbps) |
| 2 | Mobile Station Loopback |
| 3 | Enhanced Variable Rate Voice Service (8 kbps) |
| 4 | Asynchronous Data Service (9.6 kbps) |
| 5 | Group 3 Facsimile (9.6 kbps) |
| 6 | Short Message Service (Rate Set 1) |
| 7 | Packet Data Service: Internet or ISO Protocol Stack |
| 8 | Packet Data Service: CDPD Protocol Stack |
| 9 | Mobile Station Loopback (13 kbps) |
| 10 | STU-III Transparent Service |
| 11 | STU-III Non-Transparent Service |
| 12 | Asynchronous Data Services (Rate Set 2) |
| 13 | Group 3 Facsimile (14.4 or 9.6 kbps) |
| 14 | Short Message Service (Rate Set 2) |
| 15 | Packet Data Service: Internet or ISO Protocol Stack (14.4 kbps) |
| 16 | Packet Data Service: CDPD Protocol Stack (14.4 kbps) |
| 17 | High Rate Voice Service (13 kbps) |
| 18 | Over-the-Air Parameter Administration (Rate Set 1) |
| 19 | Over-the-Air Parameter Administration (Rate Set 2) |
| 20 | Group 3 analog Facsimile (Rate Set 1) |
| 21 | Group 3 analog Facsimile (Rate Set 2) |
| 22 | Reserved for standard service options |
| 4100 | Asynchronous Data Service |
| 4101 | Group 3 Facsimile |
| 4102 | Reserved for standard service options |
| 4103 | Packet Data Service: Internet or ISO Protocol Stack, Revision 1 (9.6 or 14.4 kbps) |
| 4104 | Packet Data Service: CDPD Protocol Stack, Revision 1 (9.6 or 14.4 kbps) |
| 4105–32,767 | Reserved for standard service options |

Among the above service options, four options are available: Asynchronous Data Service (9.8 kbps), Packet Data Service: Internet or ISO Protocol Stack, Asynchronous Data Service (14.4. or 9.6 kbps), and Packet Data Service: Internet or ISO Protocol Stack (14.4 kbps). One of the four service options is selected according to network architecture and a data rate and designated as a traffic information service between the vehicle navigation apparatus and the BTS. The selected service option of the OM is analyzed and processed in the BTS.

In step 262, the BTS transmits a channel assignment message (CAM) to the MS, notifying that when Assign_Mode is 100, the BTS will support information requested by the MS at a mode indicated by Granted_Mode. Those of ordinary skill in the art recognize that the terms "Assign_Mode" and "Granted_Mode" are terms utilized by the IS-95B specification. The MS transmits information about the location of the vehicle to the BTS on a channel agreed between the MS and the BTS and the BTS provides traffic information received through a BSC to the MS, in step 264, which indicates the exchange of information between the MS and the BTS. The controller 111 of the vehicle navigation apparatus maintains an established channel from step 264 onward. While the above-described procedure has been described according to IS-95-B, the messages can be defined according to IMT-2000 standards or the standards applied to existing mobile phones.

Referring back to FIG. 5, the controller 111 receives the traffic information from the mobile terminal via the handset connector 112 in step 210, and displays the received route information on a map received from the CD-ROM driver 117 on the display 118 in step 212. Consequently, the current location and destination of the vehicle and the most convenient and a shortest route to the destination are marked on the map as shown in FIG. 1. Referring to FIG. 1, the selected route is road (01) to road (02) to road (28) to road (10) to road (11) to road (06). While displaying the route, the controller 111 sets the timer to a predetermined time to provide the location information to the navigation server. In step 214, the controller 111 determines whether the timer has expired. If time has expired, the procedure goes to step 216. If the time has not expired, the process goes to step 218.

In step 216, the controller 111 outputs the current location information to the handset connector 112 based on data received from the satellite signal receiver 114 and the mileage calculator 116, so that the handset can transmit the location information to the BTS 10. In step 218, the controller 111 determines whether the vehicle has arrived at the destination. If the current vehicle location is identical to the location of the destination or the user has entered a key indicating arrival at the destination, the controller 111 determines that the vehicle has arrived at the destination. If the vehicle has arrived at the destination, the controller 111 goes to step 220. If the vehicle has not arrived at the destination, the controller 111 returns to step 212. The controller 111 transmits a signal indicating termination of the navigation service in step 220, and terminates the call in step 222 if the vehicle has arrived at the destination.

Figure 8:
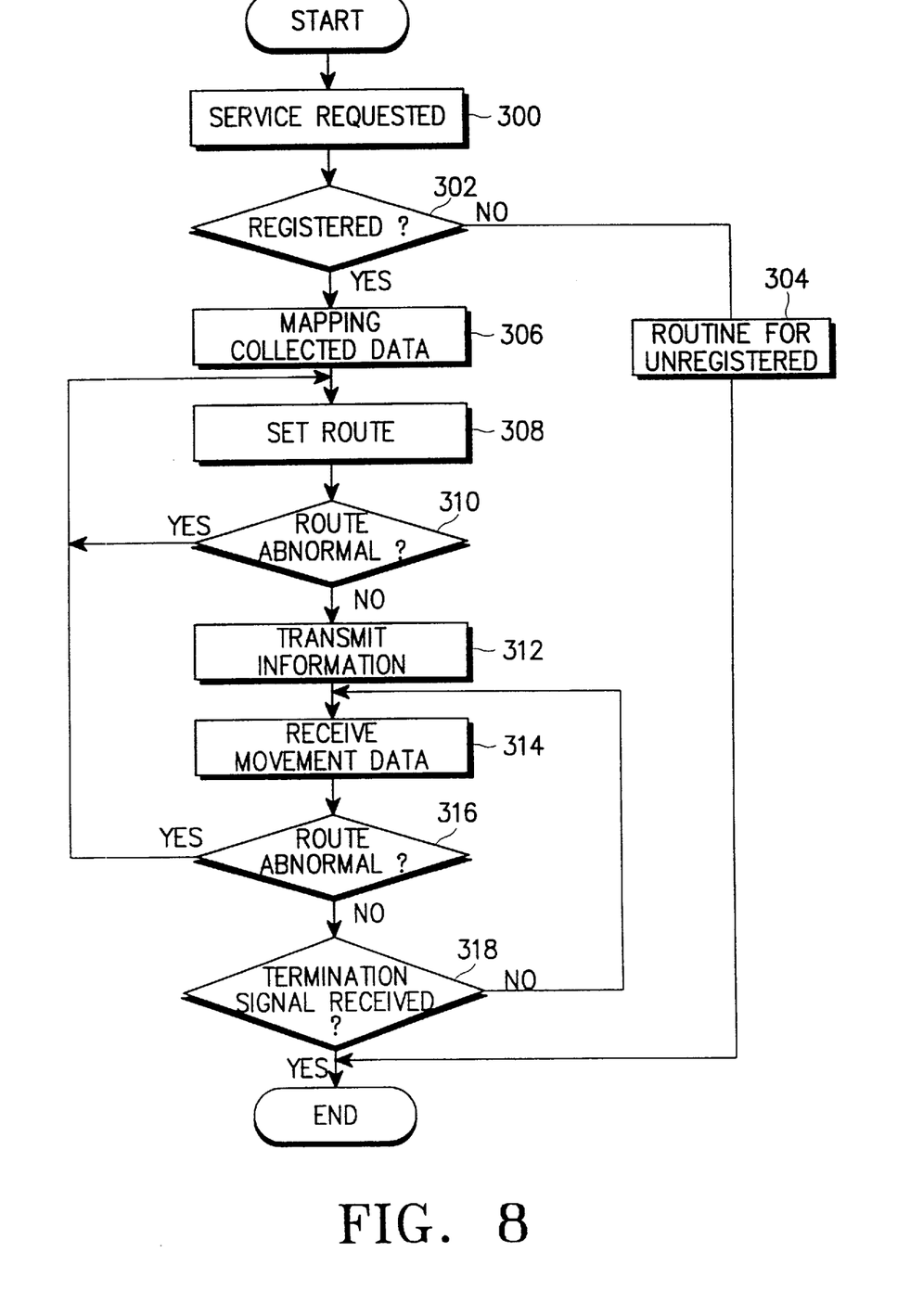
FIG. 8 is a flowchart illustrating a control operation for providing a navigation service in the navigation server according to the preferred embodiment of the present invention.

FIG. 8 is a flowchart illustrating a control operation for providing a navigation service in the navigation server, according to the preferred embodiment of the present invention.

The navigation server 70 receives a navigation service request signal from a subscriber or mobile phone 5, in step 300. This occurs after step 208 of FIG. 5 where the navigation server 70 is connected to the navigation apparatus. Upon receipt of the navigation service request signal, the BTS 10 transmits the navigation service request signal to the navigation server 70 via the BSC 20 and the ATM switch 30. In step 302, the navigation server 70 determines whether the requested navigation service is registered. If the subscriber is not registered, the navigation server 70 performs a routine for unregistered subscribers in step 304.

In the case of a registered subscriber, the navigation server 70 transmits a CAM indicating that the requested service is supported by the mobile terminal via the ATM switch 30, the BSC 20, and the BTS 10 in step 262 of FIG. 7. In step 306, the navigation server 70 maps data collected from the map information database 71 and the traffic information database 72. The navigation server 70 determines the shortest route based on information about the current vehicle location, the destination received from the user, the map data and road condition data in step 308. Then, the navigation server 70 determines whether traffic is congested or if a traffic accident has occurred on the determined route in step 310. If an abnormality such as a traffic accident, is found on the route, the navigation server 70 re-designates the best route from the other routes in step 308.

On the other hand, if the determined route is normal in step 310, the navigation server 70 transmits the route information to the mobile terminal in step 312. If the OM received in step 260 of FIG. 7 indicates the absence of map data, the navigation server 70 transmits the route information together with the map data to the mobile terminal. Upon receipt of data related with movement of the vehicle in step 314, the navigation server 70 determines whether an abnormality has occurred on the route in step 316. If an abnormality is found, the navigation server 70 returns to step 308 and re-sets the best route. If there is no abnormality, the navigation server 70 determines whether a signal indicating termination of the navigation service has been received in step 318. Upon receipt of the termination signal, the navigation server 70 ends the navigation service. If the navigation server 70 does not receive the termination signal, it returns to step 314.

While the navigation service is requested and established via the ATM switch 30 in the procedure shown in FIG. 8, the Internet 60 can act as a substitute for the ATM switch 30. In this case, channels used for providing the navigation service must be maintained with the Internet 60, until the call is terminated.

In accordance with the present invention as described above, a mobile telecommunication system is connected to a navigation server, so that the navigation server can provide through a mobile terminal, traffic information and information about a route for a mobile terminal user to access. Therefore, a driver will be aware of road conditions that he may encounter beforehand and will be informed of a safe travel route he can utilize.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A vehicle navigation network using a mobile telecommunication system, comprising:
    a vehicle navigation apparatus having a satellite signal receiver and a mileage calculator, for determining a current location of a vehicle based on a satellite signal and mileage of the vehicle to a destination, and transmitting information about the current location of the vehicle to a base station transceiver system (BTS) periodically through a mobile terminal;
    the BTS receiving a signal from the mobile terminal and transmitting data to a base station controller (BSC) when a vehicle navigation service is requested;
    the BSC connected to at least one BTS, for discriminating a call requesting the vehicle navigation service from a typical voice call and transmission of a text message, connecting the voice call to a mobile switching center (MSC) in the case of the voice call, and connecting the vehicle navigation service requesting call to a switch in the case of the vehicle navigation service requesting call;
    a plurality of ATM switches connected to a navigation server, for handoff and transmission of packet data when the BSC requests the vehicle navigation service; and
    the navigation server receiving information about the current location and destination of the vehicle, road condition information, map information, and transmitting route information to the navigation apparatus when the vehicle navigation service is requested from an ATM switch.

2. The vehicle navigation network of claim 1, further comprising a router connected to the navigation server, for connecting ATM switches when the mobile terminal enters an area covered by a different ATM switch.

3. The vehicle navigation network of claim 1, further comprising a map information database for storing the map information.

4. The vehicle navigation network of claim 2, further comprising a map information database for storing the map information.

5. The vehicle navigation network of claim 3, further comprising a traffic information database for storing traffic information received from a traffic information collection server and updating the stored information, according to information regarding road conditions.

6. The vehicle navigation network of claim 4, further comprising a traffic information database for storing traffic information received from a traffic information collection server and updating the stored information, according to information regarding road conditions.

7. The vehicle navigation network of claim 1, wherein the mobile telecommunication system is a PCS mobile communication system.

8. The vehicle navigation network of claim 1, wherein the mobile telecommunication system is an IS-95B mobile communication system.

9. The vehicle navigation network of claim 1, wherein the mobile telecommunication system is an IMT-2000 mobile communication system.

10. The vehicle navigation network of claim 1, wherein the vehicle navigation apparatus further comprises:

a handset connector connected to the mobile terminal, for outputting information about the current vehicle location and the destination to the mobile terminal and receiving route information and traffic information from the mobile terminal;

a display for displaying a route to the destination and a map; and a controller for calculating the current location of the vehicle based on the data received from the satellite signal receiver and the mileage calculator, outputting the calculated current location to the mobile phone via the handset connector, and displaying the route on the display.

11. The vehicle navigation apparatus of claim 10, further comprising a voice processor for analyzing voice data received from the handset connector, converting the voice data to character data, and transmitting the voice data and the character data.

12. The vehicle navigation apparatus of claim 10, further comprising a keypad for receiving at least a destination data, current location data, and a termination signal.

13. The vehicle navigation apparatus of claim 11, further comprising a keypad for receiving at least a destination data, current location data, and a termination signal.

14. The vehicle navigation apparatus of claim 10, further comprising a CD-ROM driver for reading map information.

15. The vehicle navigation apparatus of claim 11, further comprising a CD-ROM driver for reading map information.

* * * * *